April 18, 1939.  P. PHELPS ET AL  2,154,696
APPARATUS FOR REFRIGERATING ARTICLES IN TRANSIT
Filed July 17, 1936  7 Sheets-Sheet 1

INVENTOR
Paul Phelps
Walter E. Zoeller
BY
ATTORNEYS

April 18, 1939.   P. PHELPS ET AL   2,154,696
APPARATUS FOR REFRIGERATING ARTICLES IN TRANSIT
Filed July 17, 1936   7 Sheets-Sheet 6

INVENTOR
Paul Phelps
Walter E. Zoeller
BY
ATTORNEYS

April 18, 1939.   P. PHELPS ET AL   2,154,696
APPARATUS FOR REFRIGERATING ARTICLES IN TRANSIT
Filed July 17, 1936    7 Sheets-Sheet 7

INVENTOR
Paul Phelps
Walter E. Zoeller
BY
ATTORNEYS

Patented Apr. 18, 1939

2,154,696

UNITED STATES PATENT OFFICE 2,154,696

APPARATUS FOR REFRIGERATING ARTICLES IN TRANSIT

Paul Phelps and Walter E. Zoeller, Louisville, Ky., assignors, by mesne assignments, to The Girdler Corporation, Louisville, Ky., a corporation of Delaware Application July 17, 1936, Serial No. 91,087

22 Claims. (Cl. 62—114)

The present invention relates to apparatus through which comestibles or analogous products may be continuously advanced while being cooled, chilled, or frozen to harden the same.

The specific embodiment hereinafter described is designed fo the hardening of partially frozen peripherally wrapped bars of ice cream or the like, which may be formed or produced in any suitable manner as for instance by an apparatus of the general type shown in the Vogt Patents 2,006,375 and 2,006,376, issued July 2, 1935. After hardening, the bars may be cut up into shorter lengths or into individual service portions, for instance of the general type shown in the Vogt Patent 1,906,183, issued April 25, 1933.

One object of the present invention is to provide a new and improved apparatus of the type referred to, in which the bar carrier is entirely within the refrigerated chamber but to which and from which the bars may be easily and effectively delivered.

Another object is to provide a compact hardening apparatus which is so constructed as to obtain the maximum refrigerating effect from a gaseous chilling medium circulated in the hardening chamber, and with the minimum tendency for said medium to escape therefrom in normal operation.

Another object is to provide a hardening room conveyer which permits and effects movement of the bars in respect to their supports, so that all portions of the surface of each bar are exposed to the direct action of the chilling medium during its travel through the hardening room.

Another object is to provide bar carriers on the conveyer, which are of simple construction, and which expose the maximum amount of the peripheries of the bars therein to the direct action of the chilling medium.

Another object is to provide an apparatus of the type referred to in which the conveyer for the articles to be refrigerated may be easily moved as a unit from the hardening room.

Another object is to provide an apparatus of the type referred to in which the conveyer is so constructed and arranged as to permit the comestible articles to be dropped in rapid succession onto the conveyer and equally rapidly delivered therefrom, and each article retained in the chamber for the desired refrigerating action.

As a feature of the present invention, the endless conveyer is festooned in compact form in a multiplicity of substantially vertical runs, and the bar carriers are so constructed that the articles are equally effectively and loosely held during the upward and downward runs and while passing from one run to the next at the top and bottom.

As another feature, the endless conveyer has an extension comprising a pair of superposed and successive horizontal runs, the upper serving to receive the articles to be refrigerated, and the lower serving to deliver them after being refrigerated, the conveyer belt passing directly from the lower to the upper run so that the conveyer is continuously loaded along substantially its entire length.

As another feature, the conveyer includes parallel outer runs and a series of intermediate runs parallel to said outer runs and of shorter length to provide a space into which the cold air from a refrigerating apparatus may be delivered and circulated therefrom in well regulated streams along the parallel runs of said conveyer.

As still another feature, the hardening room extension which encloses the horizontal runs of the conveyer, is provided with a top opening with which the bar carriers come into successive registry, and through which the bars to be hardened are successively dropped for advancement through said hardening room, and a bottom opening through which the bars, as they complete their cycle through the hardening room, are gravitationally discharged.

As another feature, the hardening room conveyer is mounted on a portable frame which may be moved out of the hardening room as a unit for cleaning or other purposes.

Various other objects, features and advantages of the invention will be apparent from the following description of a typical embodiment, and from an inspection of the accompanying drawings in which:—

Figure 20:
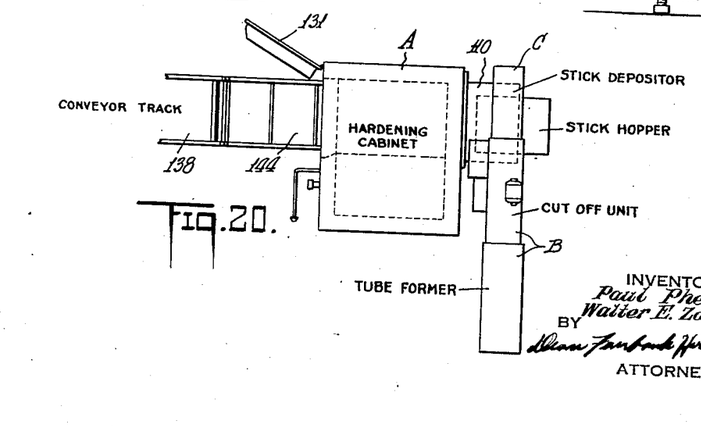
Fig. 20 shows the general diagrammatic layout of the hardening room and other apparatus for continuously processing material.

The specific embodiment of the invention shown is particularly adapted for the hardening of peripherally wrapped bars of partially frozen ice cream or the like. In Fig. 20, there is shown a layout of various suitable apparatus which may be used for forming, cutting and delivering these bars to the hardening room A of the present invention. In this layout, the material is delivered from a suitable apparatus (not shown) which, in the case of ice cream, partially freezes it to a comparatively stiff plastic form and incorporates therein the required amount of air to give it the desired overrun. Such an apparatus may be a continuous freezer, for instance, of the type disclosed in Patents 1,783,866, 1,783,867, or 1,847,149. From this apparatus, the partially frozen ice cream may be delivered to a bar forming and cutting apparatus B where it is encased in a wrapper and cut into sections of uniform lengths. The cut sections are delivered to a bar drop mechanism C which is automatically operable to release the bars therefrom and permit them to drop successively onto the conveyer disposed in the hardening room A. The bar forming and cutting mechanism B and the bar drop mechanism C may be similar to that shown in the copending application of Phelps and Hohl, Serial No. 83,688, or may be of any other suitable form.

The apparatus of the present invention includes an insulated hardening room 10 divided into a pair of adjoining chambers or compartments 11 and 12 by a vertical partition 13 which extends from the bottom of the room and which is spaced from the ceiling to leave an opening 14. The compartment 11 serves to enclose the refrigerating apparatus which, in the specific form shown, includes a surge drum 15 and a series of substantially horizontal evaporator pipes 17, while the other compartment 12 receives the conveyer unit 18.

Figure 2:
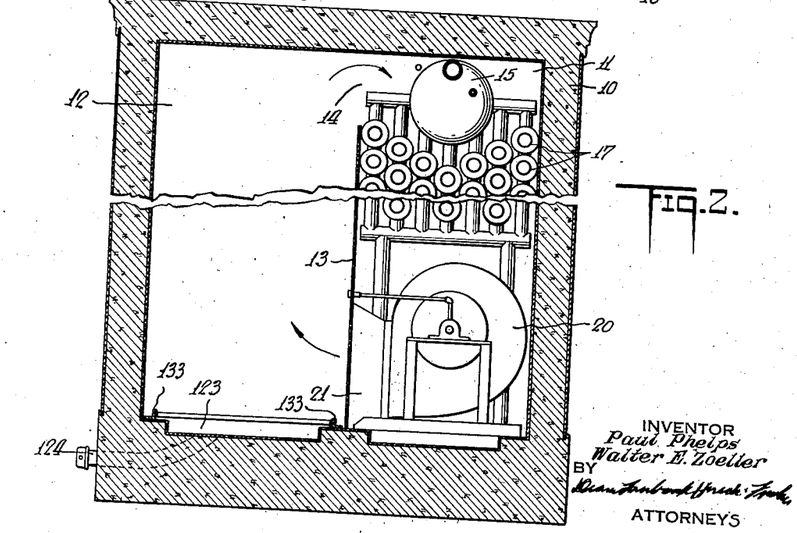
Fig. 2 is a section taken on the line 2—2 of Fig. 1.

In the lower part of the compartment 11 is a blower fan 20 driven from a motor (not shown) outside the hardening room and having an outlet 21 leading to an opening in the partition 13. This fan 20 serves to circulate the chilling air in a continuous closed cycle between the two compartments 11 and 12 as shown in Fig. 2, so that the air during this cycle is chilled by the evaporator pipes 17 and forced into the conveyer compartment 12. The details of apparatus employed in the compartment 11 for chilling the air, form no portion of the present invention and therefore have not been illustrated in detail. For the purposes of this invention, any suitable refrigerating and air circulating apparatus may be employed.

Figure 4:
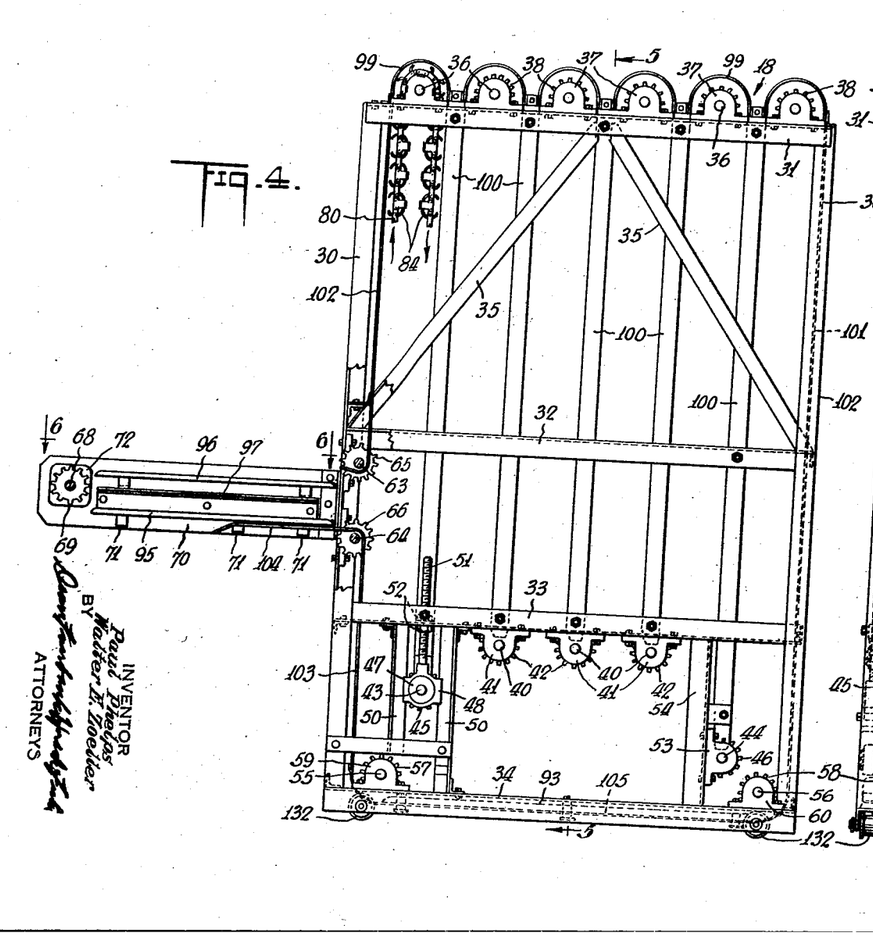
Fig. 4 is a side view of the conveyer unit itself and removed from the room, Fig. 5, on its left-hand side, is a rear view of the construction shown in Fig. 4, and on its right-hand side is a section taken along the line 5—5 of Fig. 4.
Figure 5:
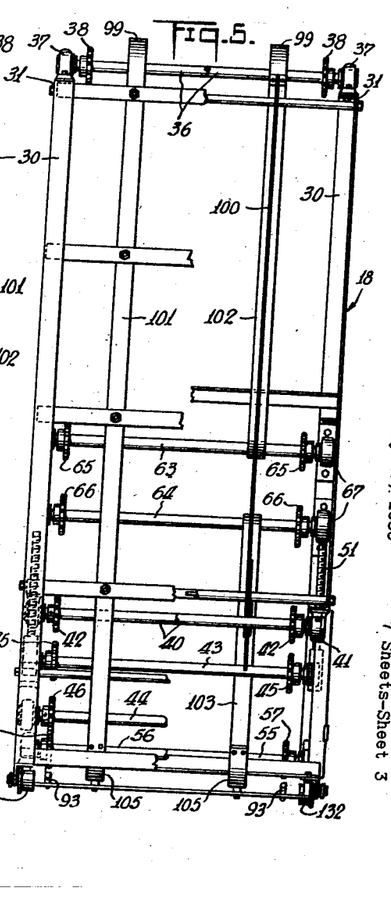

In carrying out the present invention, there is employed a conveyer unit 18 of the endless festooned type, which has a pair of outer vertical runs 22 and 23 (Figs. 3–5), a series of intermediate vertical runs 24, a pair of vertical runs 25 between the series of vertical runs 24 and the outer run 22, a pair of vertical runs 26 between the runs 24 and the other outer run 23, and a horizontal bottom run 27. The upper ends of all of these runs are in horizontal alinement and close to the ceiling of the hardening cabinet 10, while the lower ends of the intermediate runs 24 are spaced above the lower ends of the runs 22, 23, 25 and 26 to form a space 27a opposite to the partition opening at the outlet of the fan 20. The air blown from the fan 20 into the compartment 12 is directed into this space 27a and is then led upwardly in well-regulated manner along the runs of the conveyer unit to chill the comestible articles thereon.

As another feature of the present invention, there is provided a pair of superposed substantially horizontal runs 28 and 29 extending from the outside vertical run 22 intermediate of the ends of the latter. The upper run 28 serves to receive the bars to be hardened and the lower run 29, in the form shown in Figs. 1–8, serves to discharge the bars after they have been hardened.

The conveyer is constructed as a portable unit which may be moved in or out of the chamber 12. For that purpose, the conveyer is mounted on a skeleton frame structure which, in the specific form shown, includes four vertical corner posts 30 mounted in rectangular relationship and held together by a pair of top horizontal cross pieces 31, a series of intermediate cross pieces 32 and 33, a pair of bottom cross pieces 34, and a plurality of diagonal braces 35.

The conveyer is of the duplex endless chain type, and is supported by a series of parallel equally spaced horizontally alined shafts 36 adjacent to the ceiling of the chamber. These shafts are journaled in bearings 37 fixed to the top frame cross pieces 31 and each carries a pair of spaced sprocket wheels 38 over which the upper turns of the conveyer extend.

At the bottom turns of the intermediate conveyer runs 24 there is provided a plurality of parallel shafts 40 in horizontal alinement, three of such shafts being shown in staggered relationship with respect to the upper shafts 36. These shafts 40 are journaled in bearings 41 fixed to the underside of the cross frame piece 33 and each carries a pair of sprockets 42.

On opposite sides of the series of shafts 40 and below said shafts is a pair of shafts 43 and 44 carrying respectively the sprockets 45 and 46 above which the bottom turns of the runs 25 and 26 extend. These shafts are each arranged midway between a pair of adjacent top shafts 36. One of said shafts, as for instance the shaft 43, is vertically movable for adjusting any slack on the conveyer chains. For that purpose, this shaft 43 may be journaled in bearings 47 mounted on blocks 48, each having a slidable engagement with a pair of vertical guide members 50 fixed to the frame structure of the machine. Connected to the upper end of each of the blocks 48 is a screw 51 passing through an opening in the cross frame piece 33 and held in lengthwise adjusted position with respect to said frame piece by a pair of locking nuts 52. The other shaft 44 is journaled in the bearings 53 connected to a frame member 54.

In order to define the turns between the outer runs 22 and 23 and the horizontal run 27, there is provided a pair of horizontal shafts 55 and 56 carrying the sprockets 57 and 58 respectively and journaled in the bearings 59 and 60 respectively fixed to the frame pieces 34. These shafts 55 and 56 are arranged in vertical alinement with the end shafts 36 at the top.

In order to define the turns between the horizontal extension runs 28 and 29 and the outer vertical run 22, there is provided a pair of spaced vertically alined shafts 63 and 64 carrying the sprocket wheels 65 and 66 respectively, and journaled in bearings 67 connected to the corner posts 30.

The forward ends of the horizontal extension runs 28 and 29 are defined by sprockets 69 on a shaft 68 journaled in bearings 72 bolted or otherwise secured to plates 70 which extend substantially along the entire length of the horizontal conveyer extension and which are fixed to the frame structure of the conveyer. These plates are connected together at their bottoms by a series of cross braces 71.

The sprockets on the various shafts are arranged in two parallel series to receive a pair of parallel endless chains 80, each comprising a series of links 81 connected together by pivot pins 82 encircled by spacing rollers 83 between which the teeth of the sprockets extend.

Supported between the two conveyer chains 80 is a series of spaced carriers 84 adapted to support and carry the comestibles in bar form. As an important feature of the present invention, these carriers are so constructed as to permit the rolling of these comestible bars therein as these carriers travel around the sprocket wheels, so that all portions of the surfaces of these bars are exposed to the direct action of the refrigerant gas in their path of movement. Furthermore, these carriers are of such open work construction as to expose the maximum amount of the peripheries of the bars at all times.

These bar carriers extend substantially equally from both sides of the center lines of the chains 80 so as to give these carriers sufficient turning space around the lower sprockets 42, 45 and 46 without enlarging said sprockets. For that purpose, the links at equally spaced intervals on the inner side of each chain, are in the form of angular brackets 85 (Figs. 8–11), and these brackets on the two chains 80 are arranged in transverse alined pairs for supporting the carriers 84 in parallel spaced relationship.

Each carrier 84 includes a cross bar 86 connected at its ends to the chains. As shown, the bar is flat and is secured to a pair of the alined brackets 85. Each bar 86 supports a holder for the comestible bar and in the form of a C-shaped ring 87 with an opening 88 wide enough to permit a comestible bar to be freely dropped therethrough, and defines a substantially elliptical bar receiving socket having a width between the curved ends of said socket greater than the diameters of the bars to be hardened, to permit the bars to roll freely in said holders as they travel over the conveyer turns. These bar holders 87 are secured on the cross bars 86 in any suitable manner. For instance, each holder is externally provided with a groove 91 for receiving the bar 86, and is connected to said bar by rivets 92. As shown, each bar 86 has two spaced holders 87 but a larger number of the holders or only one of greater length may be used.

The horizontal runs of the conveyer chains 80 are suitably supported against sagging. For instance, the bottom horizontal runs 27 of the two chains 80 are supported respectively on a pair of rails 93 which are connected to the frame structure of the apparatus and which are narrow enough to permit the rollers 83 of these chains to ride freely over said rails.

Figures 6, 7, 8, 9:
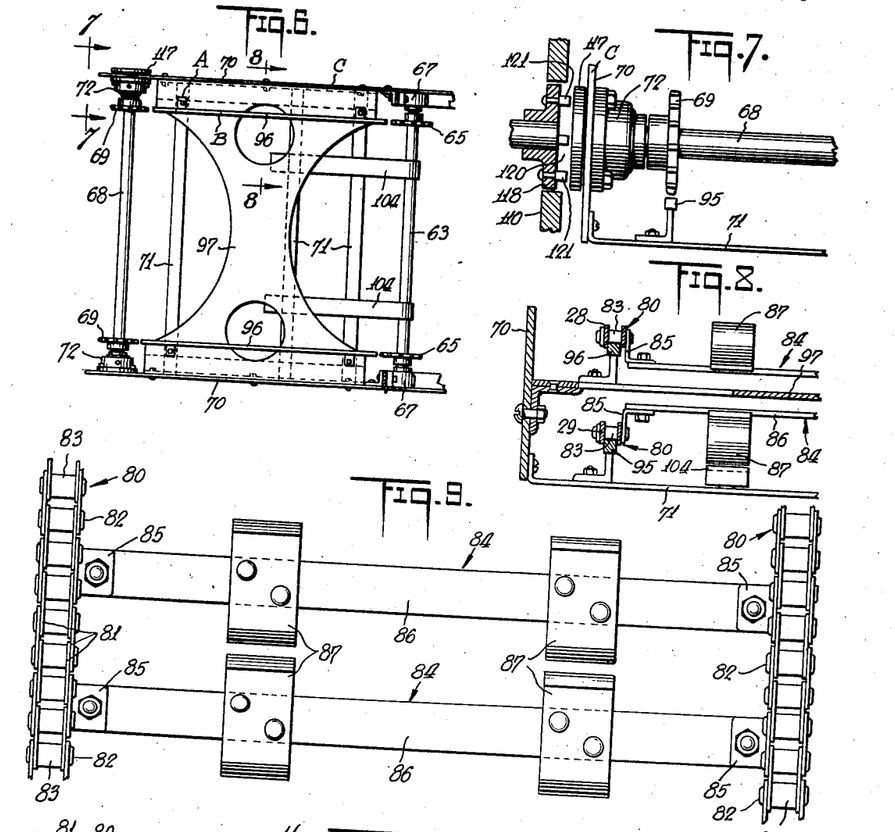
Fig. 6 is a top plan view of a portion of the horizontal conveyer extension.
Fig. 7 is a front view of a portion of the conveyer extension taken along the line 7—7 of Fig. 6.
Fig. 8 is a section taken along the line 8—8 of Fig. 6.
Fig. 9 is a top plan view, somewhat enlarged, showing a portion of the conveyer chains and the bar carriers thereon.
Figure 10:
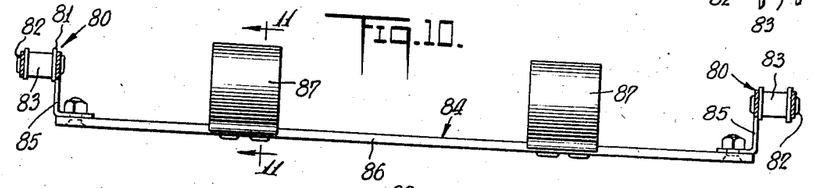
Fig. 10 is a front view of the parts shown in Fig. 9.
Figure 11:
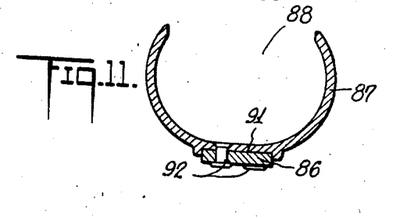
Fig. 11 is a section taken on the line 11—11 of Fig. 10.

The horizontal extension runs 28 and 29 are similarly supported against sagging. For that purpose, the cross braces 71 support a pair of tracks 95 sufficiently narrow to permit the rollers 83 of the chains of the lower horizontal run 29 to ride thereover as shown in Fig. 8. The upper run 28 of the chains 80 is similarly supported by a pair of tracks 96 connected to a cross plate 97 fixed at its ends to the side plates 70.

The bar carriers 84 are so mounted on the conveyer chains 80 that the open sides of the holders 87 extend outwardly as they travel over the top sprockets 38, and inwardly as they travel over the lower sprockets 42, 45 and 46, so that the comestible bars will be retained in these holders against gravitation as they pass over these sprockets. However, since the holders are constructed to permit the limited movement of the comestible bars therein, it is advantageous to provide a series of curved guides 99 (Figs. 3, 4 and 5) around the upper sprockets 38 to positively prevent the bars from leaving their holders for any cause as they travel around said sprockets 38.

As a safeguard against any accidental jarring of the comestible bars out of their holders as they travel along the vertical runs 24, 25 and 26, it is desirable to provide a series of thin guide strips 100 fixed to the frame structure of the machine with their edges closely adjacent to the outer edges of the holders 87. These guide strips 100 extend downwardly to a point close to the lower shafts 40, 43 and 44, and their lower ends serve to prevent any accidental displacement of the comestible bars as they travel around the lower sprockets.

The outside vertical run 23 may also be provided with vertical guide strips 101 for preventing the bars from accidentally falling out as they travel along said run. These guide strips 101 extend the full length of the run and are connected at their upper ends to the end curved plates 99.

The other outside vertical run 22 is provided at its upper portion with a guide strip 102 which is connected at its upper end to the end curved plate 99 and which is curved at its lower end around the shaft 63.

The lower portion of the vertical run 22 is provided with a guide strip 103 curved around the shaft 64 and having a horizontal extension 104 disposed below the lower horizontal extension run 29.

As the bar carriers 84 travel along the bottom horizontal run 27, the open sides of the bar holders 87 will be facing downwardly. In order to prevent the bars from falling out as they travel along this bottom run there is provided a pair of guide strips 105 fixed to the frame structure of the conveyer and curved at its ends around the sprockets 57 and 58.

The comestible bars in their travel from the conveyer extension run 28 to the bottom of the vertical run 23 are supported and retained in the bar holders 87. By the time the bar holders 87 reach the bottom of the vertical run 23, the comestible bars thereon have been hardened sufficiently so that the pushing or rolling of said bars along the guide strips 105 does not deform them.

The horizontal extension portion of the conveyer is enclosed in a cabinet extension 110 having a top wall 111 and a bottom wall 112. As a feature of the present invention the top wall 111 of this extension is provided with a slot 113 having a length and width slightly larger than the length and width of the comestible bar to be hardened so that the bars may be successively dropped through said slot, and onto the bar carriers 84. In the form shown in Figs. 1–8, the bottom wall 112 of the cabinet extension is provided with a discharge opening 114 just beyond the forward end of the guide extension 104, and the forward ends of the guide extensions 104 slant downwardly so that the hardened comestible bars on the bottom extension run 29 as they reach the ends of the guide extensions 104 slide along the forward ends of said extensions and drop out through the opening 114. A suitable chute 115 may be placed below said opening 114 to receive the bars as they are successively discharged through said opening 114. It will be noted that the receiving and discharge points are close together on the same side of the chamber so that one workman may oversee both operations and both the operations are solely by gravity. The hardened bars, when discharged, may be cut into individual service portions and packaged.

The top wall 111 may be provided with an opening 109 big enough to permit inspection of the interior of the cabinet extension 110, said opening being normally closed by an easily movable cover 116.

In order to drive the conveyor chains, the shaft 68 extends at one end through the bearing 69 and beyond the plate 70 (Fig. 7). Connected to this shaft extension is a clutch element 117 adapted to cooperate with a clutch 118 which is connected to suitable driving means, and which is movable axially through an opening 120 in the side of the cabinet extension 110. The clutch element 118 in the specific form shown, has a series of pins 121 adapted to extend into corresponding positioned holes in the clutch element 117. The clutch element 118 may be driven in predetermined timed relationship with the mechanisms B and C which form the comestible bars, cut them into lengths, and drop them successively at predetermined intervals through the slot 113, so that the hardening of these bars may form part of a continuous process. The clutch, when disengaged, permits the entire conveyor to be removed from the chamber.

The bottom of the conveyor compartment 12 is provided with a metal lined recess 123 serving as a receptacle for collecting any drippings from the comestible bars being hardened, the contents of this receptacle being drained to the outside of the cabinet by a suitable pipe 124.

In order to permit the conveyer unit to be moved out of the compartment 12 when it is desired to clean the inside of the compartment or to clean the conveyer unit itself, said compartment 12 is provided with an opening 130 which is disposed on the side of the conveyer compartment 12 opposite the cabinet extension 110, and which is big enough to permit the bodily movement of the conveyer unit therethrough, said opening being normally closed by a heat insulated door 131 which is shown as hinged but which is preferably supported by and bodily movable toward and from the opening in an overhead track.

The frame of the conveyer unit is provided with four flanged wheels 132 resting on a pair of spaced rails 133 disposed in the interior of the compartment and extending towards the opening 130. These rails 133 are shown connected together by a pair of tie rods 134 to form a unit 135 and are fixed to the bottom floor of the conveyer compartment 12 by any suitable means, as for instance bolts 136, passing through horizontal flanges 137 of the rail unit and embedded in the concrete floor.

Figure 12:
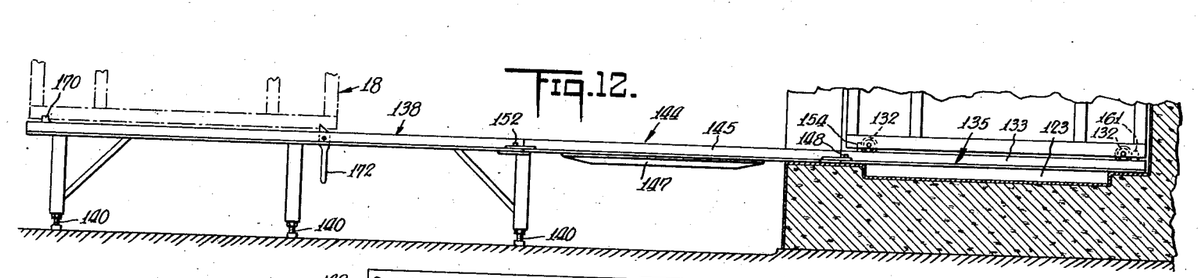
Fig. 12 is a section of the lower portion of the hardening room, and shows rails mounted in position on the outside of the room ready to receive the conveyer unit.
Figure 18:
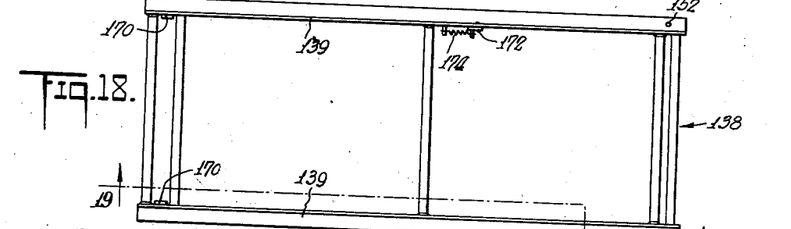
Fig. 18 is a top plan view of the rail unit which is adapted to be permanently positioned outside of the hardening room, and which serves to receive the conveyer unit when said latter unit is rolled out of said hardening room.
Figure 19:
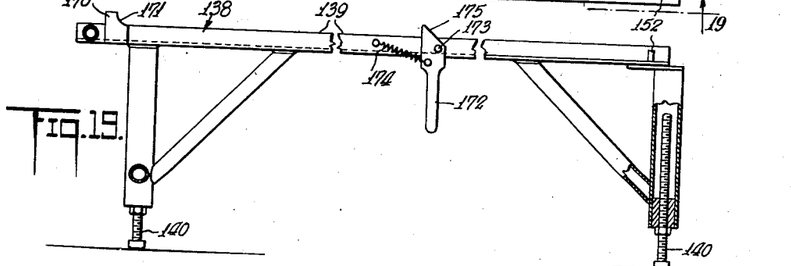
Fig. 19 is a side view of a portion of the rail unit shown in Fig. 18, and shows parts of said construction in section.

For supporting the conveyer unit after it has been rolled out of the conveyer compartment 12, there is provided a rail unit 138 (Figs. 12, 18 and 19) which is spaced from the hardening room a sufficient distance to permit the door 131 to be swung open, and which, in the specific form shown, includes a pair of spaced rails 139 extending in axial alinement with the rails 133 in the conveyer compartment, and supported on a series of axially adjustable leg extensions 140.

Figure 16:
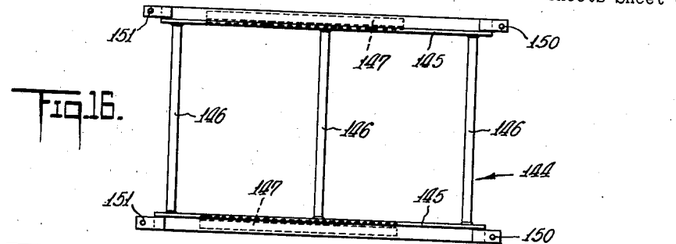
Fig. 16 is a top plan view of the portable rail bridge unit adapted to be detachably connected to the hardening room rails.
Figure 17:
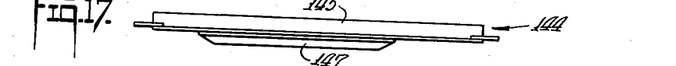
Fig. 17 is a side view of the rail bridge unit shown in Fig. 16.

A detachable bridge 144 (Figs. 12, 16 and 17) is also provided for connecting the rail units 135 and 138, and comprises a pair of spaced rails 145 connected by a series of tie rods 146 and having suitable bracing members 147 at the bottom thereof. The bridge unit 144 may be detachably secured to the rail units 135 and 138. For instance, the rail unit 135 is provided respectively at its end near the door 131 with upwardly projecting pins 148, the bridge unit 144 having corresponding holes 150 at one end for receiving said pins, so that said bridge unit can be easily dropped into connecting relationship with the rail unit 135. The other end of the bridge unit 144 is similarly provided with holes 151 for detachably engaging pins 152 at one end of the fixed rail unit 138. When the three rail units 135, 144 and 138 are connected together end to end, they will provide a continuous line of rails along which the conveyer may be rolled out of the hardening room and onto the rail unit 138.

Figures 13, 14, 15:
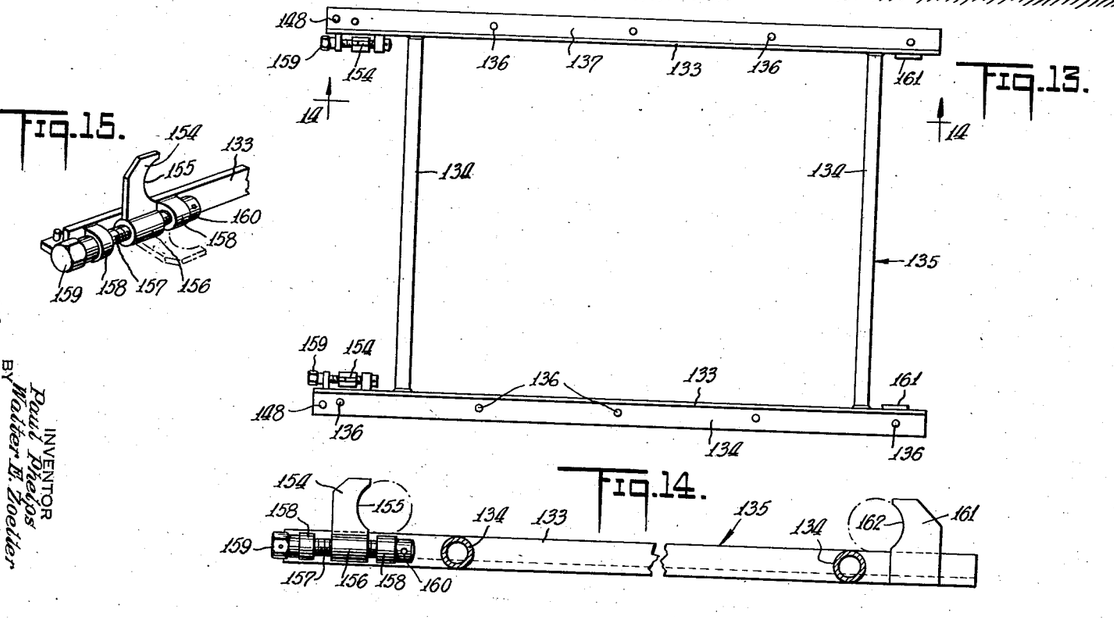
Fig. 13 is a top plan view of the rail unit which supports the conveyer unit in the interior of the hardening room conveyer.
Fig. 14 is a section, somewhat enlarged, taken on the line 14—14 of Fig. 13.
Fig. 15 is a perspective view showing certain details of the device for holding the conveyer unit in position in the hardening room.

Means are provided for locking the conveyer unit in position in the conveyer compartment 12 against accidental rolling. In the form shown, said means includes a pair of locking plates 154 (Figs. 13, 14 and 15), each having a curved slot or socket 155 for receiving a wheel 132, and a boss 156 threaded onto a screw bolt 157 passing loosely through the pair of spaced lugs 158 connected to the inner sides of each rail 133 at the end thereof nearest to the door 131. This screw bolt 157 is provided with a head 159 at one end and a collar 160 at the other end to prevent axial movement of said bolt. The other ends of the rails 133 carry fixed stops 161 having curved sockets or grooves 162 for engaging the other wheels 132.

When it is desired to move the plate 154 out of locking position to permit the rolling out of the conveyer unit, the bolt head 159 is turned in a direction to move said plate away from the wheel 132 engaging it. When moved to a sufficient distance to clear said wheel 132, the plate 154 is rotated about the screw bolt to the dotted position shown in Fig. 15. In this position, the conveyer unit may be rolled out onto the rail unit 144 and then onto the fixed rail unit 138.

In order to hold the conveyer unit against accidental rolling along the fixed rail unit 138, the far end of the unit is provided with a pair of stops 170 having curved seats 171 for receiving the ends of the rollers 132. Intermediate of the ends of the unit 138 is a lever 172 pivoted to a rail 139 at 173 and urged into upright position shown in Fig. 19 by a spring 174. This lever 172 presents an oblique surface 175 when in normal upright position, so that said lever will be rotated in a counterclockwise direction against the action of the spring 174 as the unit is rolled over said lever. As soon as the rear wheels 132 of the conveyer unit are passed beyond the lever 172, this lever, under the action of the spring 174, will be rotated in upright normal position. In this position, the lever 172 will act as a stop to prevent back rolling of the conveyer unit. When it is desired to roll the conveyer unit back into the hardening room, the lever 172 may be rotated in a clockwise direction by hand out of the way of the conveyer unit.

The construction of the conveyer unit hereinbefore described has the advantage that the unfrozen bars are delivered to the conveyer and the frozen bars are discharged from the conveyer at closely juxtaposed points on the same side of the hardening room and there is the minimum length of idle conveyer between the discharging point and the receiving point. In some plants, this advantage may not be important and the delivery and discharge of the comestible bars may be accomplished in other ways.

Figure 21:
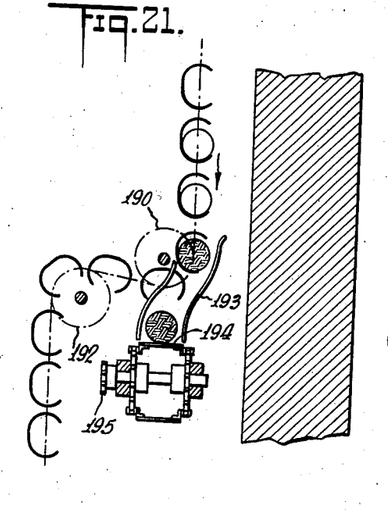
Figs. 21, 22 and 23 show alternative means for discharging the bars from the conveyer and the hardening room.

In Fig. 21 a vertical run of the conveyer passes around a sprocket wheel 190 to provide a comparatively short horizontal run and then over a sprocket 192 to continue the downward movement. The comestible bars may be discharged from the conveyer adjacent to the sprocket 190. As shown there is provided one or more guides 193 which cause the bars to move out of the holders on the conveyer and deliver them onto the second conveyer 194 which is shown as a belt running horizontally in a direction at right angles to the plane of movement of the bar holders on the main conveyer. This belt may extend to an opening in the wall of the hardening chamber so as to deliver the bars endwise through said opening. The speed of the belt 194 may be such that the comestible bars will be delivered onto the belt substantially in end to end relationship. This form of apparatus has the advantage that there is a comparatively small outlet opening not much larger than the diameter of the comestible bar, instead of a slot the full length of the comestible bar. The conveyer belt may be driven from any suitable source and pass around pulleys, one of which 195 is indicated, and may be carried by the frame of the main conveyer so that all of the moving parts may be readily removed from the chamber as in the form previously described.

Figure 22:
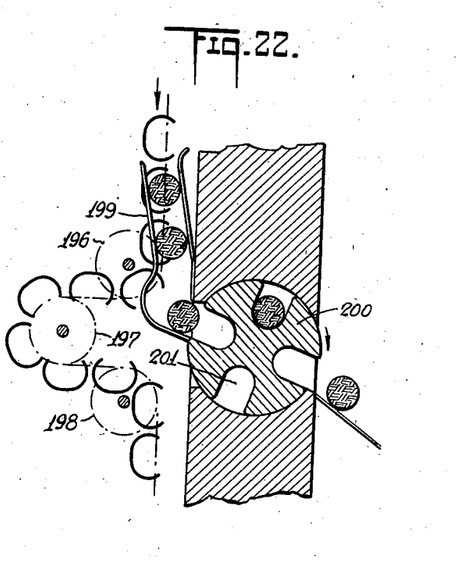

In Fig. 22, a further form is shown in which the conveyer intermediate of the upper and lower ends of a vertical run thereof passes around pulleys 196, 197 and 198, and a guide 199 is provided for receiving the comestible bars as they drop from or are removed from the holders while the latter pass in succession around the sprocket 196. In this form, the wall of the hardening room is provided with a valve member 200 which normally prevents the passage of any cold air from the hardening room or warm air into it, and has a series of pockets which receive the comestible bars in succession and convey them through the wall and discharge them on the outside of the latter. The valve 200 may be rotated at such speed that the successive pockets will come opposite to the end of the guide 199 as the successive comestible bars are delivered to said guide from the conveyer.

Figure 23:
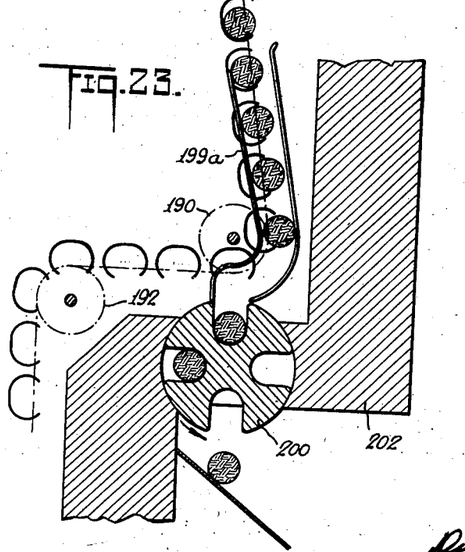

In Fig. 23, a construction is shown somewhat similar to that shown in Fig. 22 except that the third sprocket 198 is omitted and the valve 200 is mounted in a horizontal section 202 of the wall of the hardening chamber. In this construction, the comestible bars are dropped by the guide 199a into a pocket on the upper side of the valve 200 and are dropped from the pocket as it passes to the under side of the valve.

Various other means may be employed for insuring or permitting the removal of the comestible bars from the conveyer and the delivery of them to the exterior of the hardening room.

Figure 1:
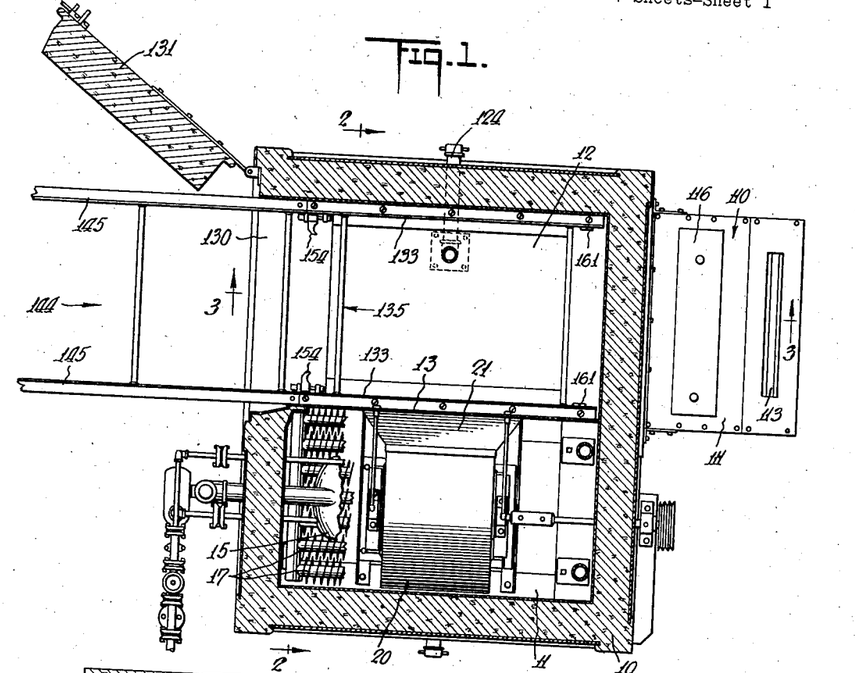
Fig. 1 is a horizontal section taken through a hardening room, the door of said hardening room being open and the conveyer removed.
Figure 3:
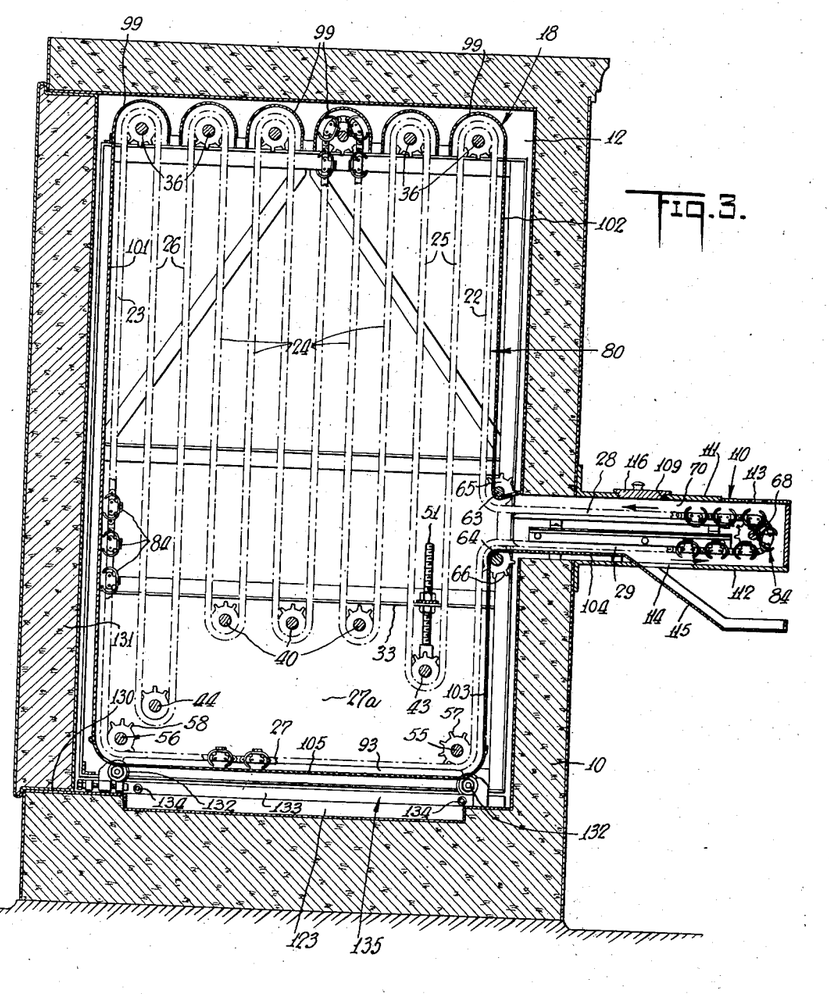
Fig. 3 is a vertical section taken through the hardening room, the conveyer being in operating position therein.
Figure 24:
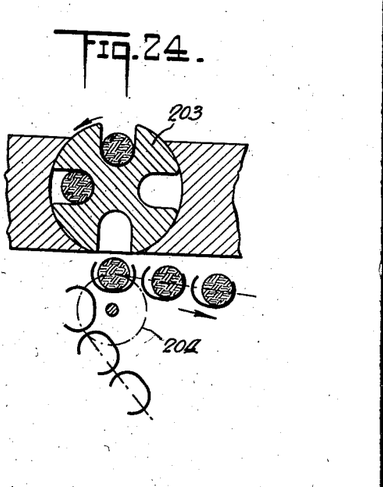
Fig. 24 shows an alternative means for supplying the bars to the conveyer.

In the construction above described in Figs. 1 and 3, the bars delivered from unit B are dropped through an open slot such as opening 113 onto the conveyer. In some cases, it may be desirable to prevent the outflow of cold air or the inflow of warm air through such slot. In Fig. 24 we have shown the insulated wall of the hardening chamber provided with an introducing valve 203 similar in all respects to the discharging valve 200 shown in Figs. 22 and 23, and serving to receive the comestible bars in a pocket when the latter is in open communication with the exterior of the chamber, and to drop them onto the conveyer when the pocket moves to the interior of the chamber. This valve may be rotated in any suitable manner and at a speed proportional to the rate of travel of the conveyer. For instance it may be driven from the sprocket 204 around which the conveyer extends.

Having thus described our invention, what we claim as new and desire to secure by Letters Patent is:—

1. A refrigerating apparatus including a hardening room having an inlet and an outlet for articles to be hardened, an endless conveyer entirely within said room, having a plurality of vertical and horizontal runs and provided with a series of spaced carriers upon which the articles may be deposited by gravity at the inlet in spaced relationship and from which said articles may be delivered by gravity at said outlet, said carriers serving to retain said articles along a plurality of vertical runs of the conveyer, and means for refrigerating said room.

2. A refrigerating apparatus including a hardening room having an opening in a wall thereof, a conveyer entirely within said room and having means thereon for supporting comestible articles in spaced relationship and having a series of substantially parallel runs of different lengths to form a space opposite to said opening, means for refrigerating air, and means for blowing said refrigerated air through said opening into said space along the runs of said conveyer.

3. A refrigerating apparatus for comestible articles, including a chamber, and means for continuously passing said articles through said chamber, including an endless conveyer entirely within said chamber and having a series of carriers for supporting the articles to be refrigerated in spaced relationship, and arranged in serpentined form to provide a series of substantially parallel runs, the outside runs of said series being longer than the inside runs to define a space at one end of said series of runs, and a blower for delivering refrigerated air to said space.

4. An apparatus for refrigerating a series of comestible articles, including a refrigerating chamber and an endless conveyer therein having a series of carriers for supporting the articles to be refrigerated in spaced relationship, and arranged in serpentined form to provide a series of substantially parallel runs, the outside runs of said series being connected together by a run extending transversely of said parallel runs and the intermediate runs having the ends nearest to said transverse run spaced a substantial distance from said transverse run to define a space, and means for delivering refrigerated air to said space between the ends of said outside runs, and opposite to the ends of the intermediate runs.

5. An apparatus for refrigerating comestible articles, including a refrigerating chamber, an endless conveyer chain entirely within said chamber and serpentined to provide a series of substantially parallel vertical runs, and a series of carriers fixedly mounted on said chain so as to remain in the same relative position with respect to said chain and having opposite end portions adapted to carry equally well the articles to be refrigerated in opposite runs of said chain.

6. An apparatus for refrigerating comestible articles, including a refrigerated chamber, an endless serpentined belt defining a series of consecutive vertical runs, and a series of article carriers fixedly mounted on said belt for movement therewith, and each having hook shaped ends spaced to form an opening on the side thereof furthest from the belt to permit the deposit of an article therein or the discharge of said article therefrom, said belt being so arranged and said carriers being so supported on said belt that the open sides of said carriers will ride upwardly on both the upper and the lower connecting turns of said vertical runs.

7. An apparatus for refrigerating comestible bars, including a refrigerating chamber, a conveyer belt therein, and carriers for supporting said comestible bars on said belts, each carrier including a pair of spaced bar encircling rings open on one side to permit a bar to be deposited therein or discharged therefrom.

8. An apparatus for refrigerating comestible articles, including a refrigerating room, a pair of endless conveyer chains movable therein, a series of cross bars connected in parallel spaced relationship between said chains, and a pair of spaced rings connected to each cross bar and open on one side for partly encircling one of said articles.

9. An apparatus for refrigerating a series of bars, including a refrigerated chamber, an endless conveyer belt having vertical and horizontal runs, and a series of bar carriers connected to said belt in spaced relationship, and each having a maximum diameter larger than the diameters of the bars to be refrigerated to permit the bars in said carriers to roll freely therein as the conveyer passes around the turns between consecutive runs, each carrier having an opening sufficiently large to permit a bar to pass freely therethrough during bar depositing or discharging operation.

10. An apparatus for refrigerating a series of bars, including a refrigerated chamber, an endless conveyer belt having vertical and horizontal runs, and having a series of transverse rods, and a plurality of spaced C-shaped rings connected to each of said rods and adapted to receive therein the bars to be refrigerated.

11. An apparatus for refrigerating comestible articles, including a refrigerating room, an endless conveyer belt therein having a series of substantially vertical runs for carrying the articles to be refrigerated, and having a pair of vertically spaced horizontal extension runs, the upper horizontal extension run being located within said room and serving as the inlet section of the conveyer.

12. An apparatus for refrigerating articles, including a refrigerating room, an endless conveyer belt therein having a series of substantially vertical runs for carrying the articles to be refrigerated, and a pair of vertically spaced directly connected horizontal extension runs both entirely within said room, the upper horizontal run being adapted to receive the bars to be refrigerated, and the bottom horizontal run being adapted to discharge the articles therefrom after said articles have been refrigerated.

13. An apparatus for refrigerating comestible articles, including a hardening room, an extension compartment extending from a side wall of said hardening room, communicating with the interior of said hardening room, and having an inlet in the top and an outlet in the bottom, and a conveyer belt in said hardening room and adapted to carry the articles to be refrigerated and having a loop disposed in said extension compartment for receiving and delivering the articles.

14. An apparatus for refrigerating comestible articles, including a hardening room, one wall of said room being substantially vertical, an extension compartment extending from said vertical wall and communicating with the interior of said hardening room, and a continuous conveyer belt in said hardening room adapted to carry the articles to be refrigerated, and having a loop portion movable through said extension compartment, one wall of said extension compartment having an opening through which the comestible articles may pass.

15. An apparatus for refrigerating comestible articles, including a hardening room having an admission opening and an outlet opening for the articles in the same wall, means for maintaining said hardening room at a low temperature, and an endless conveyer for the articles disposed entirely within said room and having a plurality of horizontal and vertical runs for carrying the articles to be refrigerated, a portion of the conveyer extending adjacent to said inlet and a closely contiguous portion of the conveyer being disposed adjacent to said outlet whereby the articles are advanced by the conveyer throughout substantially the entire length of the latter.

16. An apparatus for refrigerating comestible articles, including a hardening room, means for maintaining said room at a low temperature, a conveyer disposed entirely within said room and having a plurality of vertical and horizontal runs, carrier members on said conveyer adapted to support the articles in all of the vertical runs in both directions and in all of the horizontal runs in one direction, and a guide for supporting the articles while advanced by said carrier members in a horizontal run in the opposite direction.

17. An apparatus for refrigerating comestible articles, including a hardening room, means for maintaining said room at low temperature, and an endless conveyer entirely within said room for advancing the articles to be refrigerated, one wall of said room having an opening directly beneath a run of the conveyer and through which the articles are delivered by gravity in succession as they reach said opening.

18. An apparatus for refrigerating comestible articles, including a hardening room having an opening at one side, an endless conveyer in said hardening room having a series of carriers adapted to support the articles to be refrigerated in spaced relationship and normally held stationary against movement as a unit during refrigerating operation, a frame supporting said conveyer, and a series of supporting wheels for said frame, whereby said conveyer and frame, as a unit, may be moved out of the hardening room.

19. An apparatus for refrigerating comestible articles, including a hardening room, an endless conveyer in said hardening room having a series of carriers adapted to support articles to be refrigerated in spaced relationship and normally held stationary against movement as a unit during refrigerating operation, and a portable frame for said conveyer whereby said conveyer may be moved out of said hardening room as a unit.

20. An apparatus for refrigerating comestible articles, including a hardening room, an endless conveyer in said hardening room having a series of carriers adapted to support the articles to be refrigerated in spaced relationship and normally held stationary against movement as a unit during refrigerating operation, a portable frame for said conveyer having a series of supporting rails, a pair of tracks in said hardening room upon which said frame rests, and a portable rail unit adapted to be detachably connected to said rails in said hardening room and extending outside of said hardening room when so connected.

21. An apparatus for refrigerating comestible articles including a hardening room, means for maintaining said room at low temperature, an endless conveyer entirely within said room for advancing the articles to be refrigerated and having carriers for retaining said articles during the conveyer travel, delivery means in a wall of said room for passing refrigerated articles from said conveyer to a point external of the room, inlet means located in a wall of said room adjacent said delivery means and adapted to supply unrefrigerated articles from an external source to the carriers on the conveyer previously vacated at the adjacent delivery point whereby the conveyer may be substantially fully loaded at all times within the hardening room.

22. A refrigerating apparatus including a hardening room having an open space cooled by means of a circulating medium, an endless moving conveyer means disposed entirely within said room, and having a series of carriers for supporting the articles to be refrigerated in spaced relationship, a plurality of supporting means mounting said endless conveyer in the room and arranged to provide a tortuous path of travel of said endless conveyer through closely contiguous portions of said open space in order to insure continual contact of the articles with the circulating medium and to occupy an efficient heat transfer path through the space, means for removing the refrigerated articles from said conveyer carriers after passing through the room and means for introducing unrefrigerated articles into the vacated carriers adjacent the removal means whereby substantially the entire length of the said conveyer is loaded at all times.

PAUL PHELPS.
WALTER E. ZOELLER.